United States Patent Office 3,838,027
Patented Sept. 24, 1974

3,838,027
α-(N-ACYL)-AMINO ACIDS AND A PROCESS FOR PREPARING SAME
Peder Bernhard Berntsson, Vastra Frolunda, and Jan Ornulf Gaarder and Bo Robert Lamm, Goteborg, Sweden, assignors to Aktiebolaget Astra, Sodertalje, Sweden
No Drawing. Filed Sept. 13, 1972, Ser. No. 288,691
Claims priority, application Sweden, Sept. 13, 1971, 11,582/71
Int. Cl. C07b 29/06; C07c 101/08
U.S. Cl. 204—74   3 Claims

ABSTRACT OF THE DISCLOSURE

Electrochemical reduction of oxazolones of the formula

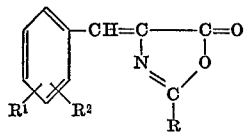

is used in the preparation of -(N-acyl)-amino acids of the formula

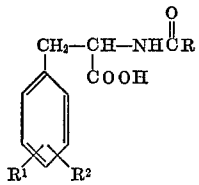

in which formula R is a straight or branched alkyl or cyclodialkyl having at most six carbon atoms or phenyl, and $R^1$ and $R^2$, which may be substituted in the 2, 3, 4, 5 or 6 position, are the same or different and are selected from the group consisting of hydrogen, alkyl, cyclodialkyl, and alkoxy each having at most six carbon atoms, halogen, hydroxy, and acyloxy, or wherein $R^1$ and $R^2$ together form a divalent radical —$OR^3O$— bound to the benzene nucleus in the 2–3 or 3–4 position, in which radical $R^3$ denotes an alkylene group having 1–3 carbon atoms. The α-(N-acyl)-amino acids obtained are useful as intermediates in the preparation of amino acids, such as L-dopa, p-chlorophenylalanine and tyrosine, having valuable known therapeutic properties.

---

The present invention relates to α-(N-acyl)-amino acids and a process for preparing them. More particularly, the invention relates to a process for preparing α-(N-acyl)-amino acids on a large scale basis and in high yields by reducing corresponding oxazolones. The α-(N-acyl)-amino acids according to the invention are compounds having the general formula

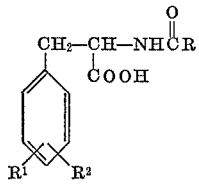

wherein R is a straight or branched alkyl or cyclodialkyl having at most six carbon atoms or phenyl, and $R^1$ and $R^2$, which may be substituted in the 2, 3, 4, 5 or 6 position on the ring structure, are the same or different and are selected from the group consisting of hydrogen, alkyl, cyclodialkyl, and alkoxy, each having at most six carbon atoms, halogen, hydroxy, and acyloxy. $R^1$ and $R^2$ may also together denote a divalent radical —$OR^3O$— bound to the benzene nucleus in the 2–3 or 3–4 position, wherein $R^3$ denotes an alkylene group having 1–3 carbon atoms. These α-(N-acyl)-amino acids are suitable intermediates in the preparation of other amino acids, particularly L-dopa, p-chlorophenyl alanine and tyrosine, which have valuable therapeutic properties as such or in substituted form. The invention includes the compound, N - acetyl - 3'-methoxy-4'-hydroxyphenyl alanine, having the structural formula

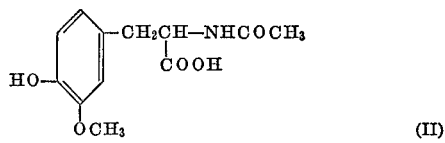

which is an intermediate in the preparation of L-doya, 3,4-dihydroxyphenyl alanine, an amino acid having valuable known therapeutic properties in the mitigation of the symptoms of Parkinson's disease.

The process according to the present invention is an electrochemical reduction of oxazolones of the general formula

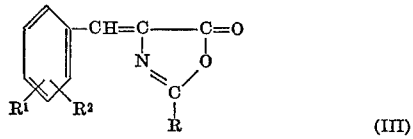

to α-(N-acyl)-amino acids of the general formula

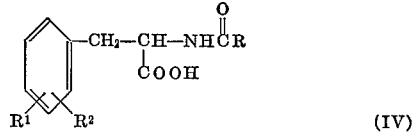

wherein, in formulas III and IV, R denotes a straight or branched alkyl or cyclodialkyl having at most six carbon atoms or phenyl, and $R^1$ and $R^2$, which may be substituted in 2, 3, 4, 5 or 6 position, are the same or different and are selected from the group consisting of hydrogen, alkyl, cyclodialkyl and alkoxy, each having at most six carbon atoms, halogen, hydroxy, and acyloxy or $R^1$ and $R^2$ together may form a divalent radical —$OR^3O$— bound to the benzene nucleus in 2–3 or 3–4 position, wherein $R^3$ denotes an alkylene group having 1–3 carbon atoms, and in particular, to the compound of formula II above.

Akyl, according to the invention, refers to lower straight or branched alkyl groups having at most six carbon atoms, such as methyl, ethyl, isopropyl, n-propyl, n-butyl, sec-butyl, tert-butyl, isobutyl, amyl, isopentyl, sec-pentyl, hexyl or lower cyclodialkyl groups, wherein each alkyl has at most six carbon atoms, such as cyclopropylmethyl, cyclobutylmethyl, cyclopentylmethyl, cyclohexylmethyl, cyclopropylethyl, cyclobutylethyl, cyclopentylethyl.

Alkoxy refers to lower, straight or branched alkoxy groups having 1–6 carbon atoms, such as methoxy, ethoxy, isopropoxy, n-propoxy, n-butoxy, isobutoxy, sec-butoxy, tert-butoxy, amyloxy, hexyloxy.

Acyloxy refers, on one hand, to alkanoyloxy groups, such as acetoxy, propanoyloxy, butanoyloxy, pentanoyloxy, hexanoyloxy, and on the other, to benzoyloxy and the like, wherein said benzene nucleus may be further substituted.

According to a preferred embodiment of the invention the electrochemical reduction is carried out under alkaline conditions. The reduction may also be carried out in an electrolytic cell having a mercury cathode so that a greater potential difference can be used across the cell.

An electrolytic cell is preferably used in which the electrodes are separated with a cation exchange membrane.

The present invention is illustrated in the following examples which should not be construed as limiting the invention in any way.

EXAMPLE 1

The preparation of N-benzoyl-4'-chlorophenyl alanine 2.75 kg. of 2-phenyl-4(4'-chlorobenzylidene)-oxazolone-5 was mixed with a hot (70° C.) solution of 12.5 l. of ethanol in 12.5 l. of 1 M NaOH. This mixture was reduced in the cathode chamber of an electrolytic cell, wherein the cathode was a mercury cathode and whereby the current density was about 0.1 a. per dm.$^2$. The cathode and anode of the electrolytic cell were separated with a membrane which permits a selective passage of small cations, but not the product which is to be reduced or has been reduced. As anode liquid a 2 M NaOH aqueous solution was used. The current was switched off when 125% of the estimated current amount had passed through the electrolytic bath, which happened after about 4 hours. The hot solution was filtered and made acid with concentrated HCl and then added to pH about 3. After 18 hours at room temperature the precipitate obtained was filtered, washed with water and then with cold 50% ethanol and dried. A yield of 2.38 kg. of N-benzoyl-4'-chlorophenyl alanine, melting point 168° C., was obtained.

EXAMPLE 2

The preparation of N-acetyl-3',4'-methylenedioxyphenyl alanine 50 g. of 2-methyl - 4 - (3',4'-methylene dioxybenzylidene)-oxazolone-5 was mixed with 1.5 l. hot 1 M NaOH aqueous solution. This mixture was reduced in the cathode chamber of an electrolytic cell in the same way as in Example 1. The current was switched off when 125% of the calculated current amount had passed through. The solution was then filtered, made acid with concentrated HCl to pH about 3, and concentrated to a volume of 500 ml., whereupon it was extracted twice with 250 ml. of ethylacetate. The ethylacetate was evaporated *in vacuo* and the residue, N-acetyl-3,4'-methylene - dioxyphenyl alanine, melting point 176–178° C., was recrystallized from water. A yield of 43 g. (74%) was obtained.

EXAMPLE 3

The preparation of N-acetyl-3'-methoxy-4'-hydroxyphenyl alanine 100 g. of 2-methyl-4(3'-methoxy-4'-acetoxybenzylidene)-oxazolone-5 was added to 2 l. of 0.5 M NaOH for a time of 30 minutes. This mixture was electrolyzed in an electrolytic cell in the same way as in Example 1. As anodic liquid 2 l. of 2 M NaOH, separated from the cathode by means of an ion exchange membrane, was used as in Example 1. The electrolyzation was carried out with a current density of 4 a. per dm.$^2$, whereby a total of 30 ah. (50% excess) was used.

After finished electrolyzation the cathode liquid was made acid to pH 5.5 using acetic acid, whereupon it was filtered clear and evaporated *in vacuo*. The oil obtained was dissolved in 330 ml. of water and made acid with 195 ml. concentrated HCl whereupon it was extracted four times with 400 ml. ethyl acetate. The collected extract was dried over anhydrous Na$_2$SO$_4$, filtered and evaporated *in vacuo*.

The preparation of L-dopa

The residue N-acetyl-3'-methoxy-4'-hydroxy-phenyl alanine in a yield of 80% (73.5 g.), smelling acetic acid, was used without further purification in an acid hydrolyzation to the free amino acid 3'-methoxy-4'-hydroxyphenyl alanine. 3'-methoxy-4'-hydroxyphenyl alanine was then reacted in a way known *per se* with phenyl acetylchloride to the formation of N-phenylacetyl-3'-methoxy-4'-hydroxyphenyl alanine. The latter then being subject to an enzymatic cleavage, whereby the L-form of 3'-methoxy-4'-hydroxyphenyl alanine was obtained, which then is reacted with HBr to the formation of 3,4-dihydroxyphenyl alanine, or as currently known, L-dopa.

EXAMPLE 4

The preparation of N-acetyl-3'-methoxyphenyl alanine 600 g. of 2-methyl-4(3'-methoxybenzylidene)-oxazolone-5 was mixed with 5 l. of 0.5 M NaOH. The mixture was electrolyzed in the same way as in Example 1, the current density being 0.1 a. per dm.$^2$ and the current amount being 200 ah. (33% excess). Neutralization was carried out using concentrated HCl to pH 8, whereupon the solution was washed twice with ethyl acetate. Thereupon the aqueous solution was made acid with concentrated HCl and extracted with ether, whereby a precipitate was obtained between the phases. After 24 hours this precipitate was filtered and washed with ether, and dried. A yield of 493 g. (75%) of N-acetyl-3'-methoxyphenyl alanine, M.P. 146–148° C., was obtained.

EXAMPLE 5

The preparation of N-acetyl-3',4'-dimethoxyphenyl alanine 60 g. of 2-methoxy-4(3',4' - dimethoxybenzylidene)-oxazolone-5 was mixed with 1.5 l. of 1 M NaOH and electrolyzed according to Example 1. 16.8 ah. (25% excess) was used having a current density of 5 a. per dm.$^2$. After filtering until clear, the aqueous phase was concentrated to 500 ml., washed with 500 ml. of ether and made acid with concentrated HCl. 30 g. crystals precipitated at room temperature. The mother liquid was evaporated and ethyl acetate added, whereupon the crystals formed were filtered, washed with cold ethyl acetate and ether. The two crystal fractions were recrystallized from water. A total yield of 45.3 g. (69%) of N-acetyl-3,5'-dimethoxyphenyl alanine, M.P. 101° C., was obtained.

EXAMPLE 6

The preparation of N-acetyl-3'-hydroxyphenyl alanine 75 g. of 2-methyl - 4 - (3'-acetoxybenzylidene)-oxazolone-5 was mixed with 1.5 l. of 0.5 M NaOH and is electrolyzed according to Example 1. 20 ah. (25% excess) at a current density of about 5 a. per dm.$^2$, was used. The mixture was filtered, acidified with concentrated HCl to pH 9–10, whereupon pH was adjusted to 8 using concentrated acetic acid. Active carbon was added to the solution whereupon the solution was heated, filtered, and evaporated until crystals precipitated (inorganic salts). Then, the solution was acidified using concentrated HCl and extracted twice with ethyl acetate. The collected ethyl acetate fraction was washed with a NaCl solution, dried above anhydrous Na$_2$SO$_4$ and evaporated. A yield of 61.5 g. (90%) N - acetyl-3'-hydroxyphenyl alanine was obtained as a light brown oil.

We claim:
1. A process for preparing compounds of the general formula

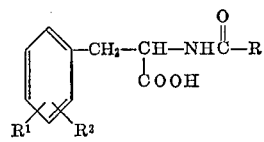

wherein R is a straight or branched alkyl or cyclodialkyl having at most six carbon atoms or phenyl, and R$^1$ and R$^2$, which may be substituted in the 2,3,4,5 or 6 position, are the same or different and are selected from the group consisting of hydrogen, alkyl, cyclodialkyl, and alkoxy each having 1-6 carbon atoms, halogen, hydroxy and acyloxy, or $R^1$ and $R^2$ are together a divalent radical —$OR^3$—O—, bound to the benzene nucleus in the 2-3 or 3-4 position, wherein $R^3$ is an alkylene group having 1 to 3 carbon atoms, which comprises reducing under alkaine conditions a compound of the general formula

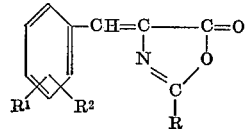

wherein R, $R^1$ and $R^2$ have the meanings given above, electrochemically using a mercury cathode, and isolating the compounds obtained by known techniques.

2. A process according to claim 1, wherein the reduction is carried out in an electrolytic cell having its electrodes separated with a cation exchange membrane.

3. A process according to claim 1, wherein 2-methyl-4(3' - methoxy - 4' - acetoxybenzylidene)-oxazolone-5 is reduced electrochemically to the formation of N-acetyl-3'-methoxy-4'-hydroxyphenyl alanine.

References Cited

FOREIGN PATENTS 341,406 7/1971 Sweden.
341,847 7/1971 Sweden.

OTHER REFERENCES

Okuda et al.: Chemical Abstracts, Vol. 52, Col. 8046 (1958).

FREDERICK C. EDMUNDSON, Primary Examiner

U.S. Cl. X.R.

260—519